May 26, 1959 H. P. TROENDLY ET AL 2,888,116

ONE-WAY CLUTCH

Filed Nov. 7, 1955

*Inventors:*
*Harry P. Troendly and*
*Bertram A. Fulton*
*By:*
*Donald W. Banner   Atty.*

United States Patent Office 2,888,116
Patented May 26, 1959

2,888,116

ONE-WAY CLUTCH

Harry P. Troendly, La Grange Park, and Bertram A. Fulton, Glen Ellyn, Ill., assignors to Borg-Warner Corporation, Chicago, Ill., a corporation of Illinois Application November 7, 1955, Serial No. 545,372

11 Claims. (Cl. 192—45.1)

The present invention relates to one-way engaging devices designed to operate in a lubricant such as oil, and more particularly, to such one-way engaging devices having means for effecting desired relationship between one of the pair of relatively rotatable cages provided and the race associated therewith.

In one-way engaging devices of the type having a pair of radially spaced and relatively rotatable cages and including sprags or wedging devices extending through the cages to engage associated cylindrical surfaces of inner and outer race members, various means have heretofore been employed to create a drag between at least one of the cages and the associated race. These prior structures have heretofore required special, sensitive, and expensive elements attached to the cage which were subject to wear, and frequently failed to provide the desired result, particularly in situations in which the one-way engaging device was submerged in an oil lubricant. A contrast to the prior art structures, the present invention provides for advantageously achieving a drag relationship between one of the cages and associated race structure in conditions in which the clutch is submerged in a lubricant, the present invention achieving such ends with simplicity.

One object of the present invention is, therefore, the provision of an improved one-way engaging device having new and improved means for effecting a drag relationship between at least one of a pair of relatively rotatable and axially spaced cages and the race associated with that one cage when the device is submerged in lubricant.

Another object is the provision of a device in accordance with the preceding object in which the improved dragging means are simple and inexpensive, yet operate with certainty.

Another object is the provision of a device in accordance with the preceding objects in which the drag between the cage and the associated race increases as the speed between those members increase.

Another object is the provision of a device in accordance with the preceding objects in which the wedging elements or sprags are moved to a position in which they are disengaged from one of the races when the relative speed between that race and the associated cage becomes excessive to minimize wear of the wedging elements.

Another object is the provision of a device in accordance with the preceding objects in which low temperature engagement of the sprags or wedging elements may be assisted.

Other objects and features of the invention will be readily apparent to those skilled in the art from the specification and appended drawings illustrating certain preferred embodiments in which.

Figure 1:
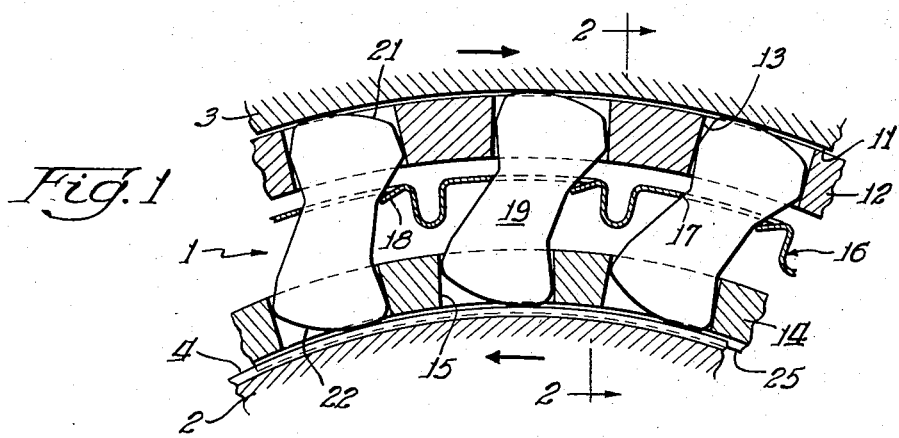
Figure 1 is a partial sectional view of a one-way engaging device according to the present invention.

In the drawings, which are partially schematic, there is shown a one-way engaging device 1 disposed between an inner race 2 and an outer race 3. The inner race comprises generally a cylindrical surface 4 (having axially spaced portions 4' to be subsequently described) and includes an outer flange portion 5, having an axially facing, circular portion 6. The inner race further comprises a ring 7, suitably mounted to the surface 4 by inter-engaging threads 8 on the surface 4 and on the ring 7. The ring 7 is provided with an axially facing surface 9, which is generally circular. The outer race 3 comprises a cylindrical surface 11, the one-way engaging device 1 being disposed between the surfaces 4 and 11.

The one-way engaging device 1 is generally of the type disclosed in the copending patent application of Harry P. Troendly, et al., Serial No. 379,534, filed September 11, 1953 and entitled "One-Way Clutch," now Patent No. 2,824,636, dated February 25, 1958, and comprises an outer annular cage 12 having a plurality of circumferentially spaced, rectangular openings 13 extending therethrough. Radially inwardly of the cage 12, and relatively rotatable with respect to that cage, is an inner cage 14 having a plurality of circumferentially spaced, rectangular openings 15 therein. Disposed between the cages 12 and 14 is a generally annular, resilient biasing ribbon 16 having a plurality of circumferentially spaced openings 17 therein, each of which is in part defined by a spring tab 18. A plurality of wedging elements or sprags 19 are provided, each of which extends through an opening 13, an opening 17 and an opening 15, and each of which is biased in a counterclockwise direction, in the view of Figure 1, by a spring tab 18. The sprags 19 are each provided with opposite race engaging surfaces 21 and 22, respectively, adapted to engage the surfaces 11 and 4. The surfaces 21 and 22 are eccentrically curved whereupon relative rotation of the races 2 and 3 in one direction will cause the sprags 19 to wedge between the races 2 and 3 and couple them together for unitary rotation; relative rotation of the races 2 and 3 in the opposite direction—as indicated by the arrows on Figure 1—will cause the sprags 19 to move to the position illustrated in Figure 1 in which the relative rotation of the races in that direction is permitted.

The outer cage 12 is provided with a radially extending pin 20 projecting from the outermost surface thereof and adjacent the cage side, pin 20 being received by an axially extending slot 20' in the surface 11 of outer race 3. The clearance between pin 20 and slot 20' is preferably of the order of 50 to 60 thousandths of an inch.

As more particularly explained in the aforementioned copending application, the circumferentially facing sides of the openings 13 and 15, and the circumferentially facing sides of each sprag within those openings, are so constructed and arranged that the sprags remain substantially in engagement with those opening sides throughout the sprag tilting range, to the end that tilting movement of any one sprag is transmitted through the cages to each of the other sprags. In other words, all of the sprags will move angularly together.

Figure 2:
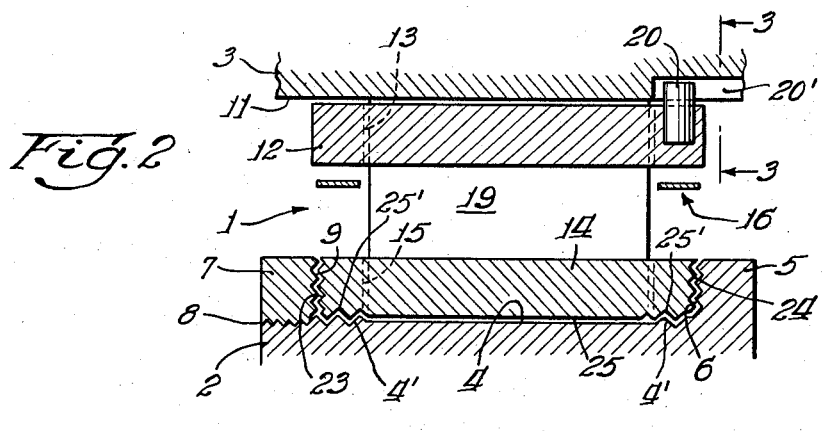
Figure 2 is a sectional view along the plane of line 2—2 of Figure 1 with parts broken away to facilitate the showing.
Figure 3:
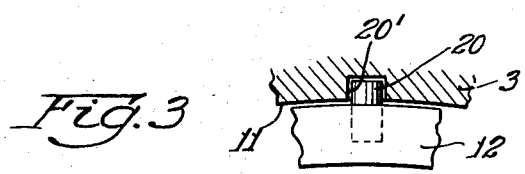
Figure 3 is a sectional view along the plane of line 3—3 of Figure 2.

Considering now the special configuration of the inner race 2 and the associated inner cage 14, attention is directed to Figure 2. That figure illustrates construction in which the inner cage 14 has axially facing surfaces 23 and 24, and a radially facing surface 25. Surfaces 23 and 24 are provided with serrations or knurls; surface 25 is similarly provided with serrations or knurls along the axially spaced portions 25' thereon. The surface 9 of the ring 7 and the surface 6 of the flange 5 are likewise provided with similar serrations or knurls; in addition, axially spaced portions 4' on the surface 4 are also provided with similar serrations or knurls. In Figure 2, these serrated or knurled surfaces have been shown to an exaggerated degree to clarify the explanation; in addition, the spacing between these serrations has been exaggerated for the same reason. Preferably, the axial and radial spacing between the inner cage and the inner race would be of the order of 3 to 5 thousandths of an inch.

The device of the present invention is designed for operation in an oil atmosphere. The general wedging operation of the sprags 19 has heretofore been described. It should be noted, however, that the device of the present invention normally provides, when submerged in oil, substantially no drag between the inner cage 14 and the inner race 2, the cages 12 and 14 moving relative to each other (and to the associated races) in the normal manner. During freewheeling conditions of the one-way engaging device—that is to say, during conditions in which the sprags 19 are not wedgingly engaged between the races 2 and 3—it is desirable to eliminate to the greatest degree possible the wear on the sprags 19. In the embodiment of the present invention illustrated in the drawings, during freewheeling conditions (as shown in Figure 1) the connection of pin 20 of the outer cage 12 to the outer race 2 causes the whole one-way engaging device 1 to rotate with the outer race. If the speed of this rotation is relatively small with respect to the inner race 2, relatively little harm is done to the sprags 19 as the surfaces 22 thereof slide along surface 4 of race 2; however, when the speed of an outer race relative to an inner race is substantial, severe wear on the sprags could occur along the inner race engaging surface thereof as they are dragged over the associated surface of the inner race. The present invention obviates such wear to a substantial degree by virtue of its unique construction. When the device illustrated is submerged in oil, an oil film will form between the serrated or knurled surfaces on the inner cage and on the inner race. As the relative speed between these elements increases, a drag is created through this thin oil film which increases with speed. As a result, when race 3 moves in a clockwise direction at high speed relative to inner race 2, the inner cage 14 will be moved in a counterclockwise direction, in the view of Figure 1, with respect to the outer cage 12. This relative movement between the cages 12 and 14 results—by virtue of the cooperation of the circumferentially spaced sides of the openings 15 with the associated circumferentially facing sides of the sprags 19—in a lifting of the race engaging surfaces 22 off of the surface 4 of the inner race 2, thereby eliminating free wheel wear at high overrunning speeds. It will be obvious that this "lift-off" is effected against the bias of the spring tabs 18 so that when the relative speed between the inner cage 14 and the inner race 2 decreases, the tabs 18 will force the sprags 19 back into a position in which the race engaging surfaces 22 are again in engagement with the surface 4 of the inner race 2.

It will furthermore be seen that this oil drag between the serrated cage and associated serrated race is effective in assisting engagement of the sprags at low temperatures. It has been experienced that a one-way engaging device, which operates completely submerged in oil, experiences difficulty in engaging when that oil is frozen; or, specifically, the sprags 19, under these conditions, do not readily break through the frozen oil film so as to engage the associated race surfaces. With the construction illustrated in the drawings showing one embodiment of the present invention, the frozen oil film between the serrated or knurled surfaces on the cage and associated race, in effect, locks the cage to the race, so that those members do not move with respect to each other. Considering the showing in Figure 1, and assuming that the device shown therein is completely emerged in oil which has been frozen, and further assuming that the inner race is held stationary while the outer race is moved in a counterclockwise direction (opposite to the direction of the arrow on the outer race in Figure 1), it will be seen that with the inner cage 14 locked to the inner race 2 by the frozen oil, the one-way engaging device 1 cannot slip along the race surfaces. More specifically, as the outer race 3 moves in "lock-up" direction as before mentioned, the outer cage 12, connected to the outer race 3, will move with the outer race and will force the sprags 19 to tilt in a counterclockwise direction inasmuch as the inner ends of the sprags 19 are prevented from sliding circumferentially by the frozen oil connection between the inner cage 14 and the inner race 2. As a result, sprags 19 will tilt immediately in a counterclockwise direction within the openings 15 in the inner cage 14, these sprags in effect pivotally moving within these opennigs. This pivotal movement and angular tilting of the sprags 19 breaks through the frozen oil film between the race engaging surfaces 21 and 22 and the associated races, and forces the sprags into wedging engagement therebetween.

While in the specific embodiment illustrated in the drawings the outer cage is connected to the outer race, and the inner cage and race are serrated or knurled to produce an oil drag therebetween, the present invention contemplates the opposite arrangement as well; namely, connecting the inner cage to the inner race and providing serrations, knurling, or the like, between the outer cage and the outer race. It will also be seen that in either case the inner race can be the overrunning member, or that both races may rotate.

It will, therefore, be seen that the device of the present invention provides a simple and economical means for inducing a speed responsive drag between cage means enclosing sprags or wedging devices and the associated race. This drag further may be so achieved that the sprags are lifted free of one of the races when the overrunning speed of the device becomes excessive, so that free wheel wear is substantially reduced. These advantages are accomplished without employing mechanical friction arrangements which are subject to wear, and consequently vary in effectiveness. In addition, the device described provides for substantial assistance in engaging of the sprags when the oil on which the one-way engaging device is submerged becomes frozen.

In the foregoing description, reference has been made to "serrated and/or knurled" surfaces for producing a fluid friction drag on one of the cages. It will be obvious that the invention is not limited to any particular irregularities in the surfaces which effect such drag. It is only essential that the cooperating race and cage surfaces which produce this fluid friction drag be so constructed and arranged that the fluid film therebetween is subjected to either shearing, turbulence or other retarding forces which cause such a condition in the fluid film that it will cause a drag between the associated cage and race surfaces as those surfaces rotate relatively, particularly at high speeds. It has been found that this force will increase with increasing relative speeds between these surfaces.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a one-way engaging device of the type adapted to operate in a lubricant, race means providing a pair of radially spaced cylindrical surfaces defining an annular aperture therebetween, generally annular cage means in said aperture, means defining a plurality of circumferentially spaced openings in said cage means, a plurality of grippers respectively extending through said openings and tiltable to wedgingly engage said races or permit relative rotation therebetween, and closely spaced and irregular surface means on at least certain of said cage means and certain of said race means effective to produce a fluid drag between at least certain of said cage means and certain of said race means to cause rotation of said certain cage means in the same direction as that of said certain race means during appreciable relative rotation therebetween when the one-way engaging device operates in a lubricant.

2. In a one-way engaging device of the type adapted to operate in a fluid lubricant, a pair of races together providing a pair of radially spaced cylindrical surfaces defining an annular aperture therebetween, generally annular cage means in said aperture, means defining a plurality of circumferentially spaced openings in said cage means, a plurality of grippers respectively extending through such openings and tiltable to wedgingly engage said races or permit relative rotation therebetween, biasing means for said grippers, and closely spaced irregular surface cooperating means on said cage means and at least one of said races effective to create a viscous drag between said one race and said cage means to cause rotation of said cage means in the same direction as that of said one race as said one race and cage means rotate relatively at sufficiently high speeds when the one-way engaging device operates in a lubricant.

3. In a one-way engaging device of the type adapted to operate in a fluid lubricant, a pair of races together providing a pair of radially spaced cylindrical surfaces defining an annular aperture therebetween, a first generally annular member within said aperture, means defining a plurality of circumferentially spaced openings in said first member, a second generally annular member in said aperture spaced radially from said first member and rotatable relative thereto, means defining a plurality of circumferentially spaced openings in said second member, a plurality of grippers respectively extending through openings in said first and second members and tiltable to wedgingly engage said races or permit relative rotation therebetween, means biasing said grippers in one direction, and closely spaced irregular surface cooperating means on at least one of said annular members and one of said races effective to create a viscous or turbulence created drag between said one race and said one annular member to cause rotation of said one annular member in the same direction as that of said one race as said one race and annular member rotate relatively at sufficiently high speeds when the one-way engaging device operates in a lubricant.

4. In a one-way engaging device of the type adapted to operate in a fluid lubricant, a pair of races together providing a pair of radially spaced cylindrical surfaces defining an annular aperture therebetween, a first generally annular member within said aperture, means defining a plurality of circumferentially spaced openings in said first member, a second generally annular member in said aperture spaced radially from said first member and rotatable relative thereto, means defining a plurality of circumferentially spaced openings in said second member, a plurality of grippers respectively extending through openings in said first and second members and tiltable to wedgingly engage said races or permit relative rotation therebetween, means biasing said grippers in one direction, means connecting one of said annular members to one of said races for substantially common rotation thereof, and cooperating means on the other of said annular members and the other race adapted to create a viscous or turbulence created drag between said other member and other race to cause rotation of said other member in the same direction as that of said other race as they rotate relatively at sufficiently high speeds when the one-way engaging device operates in a lubricant.

5. In a one-way engaging device of the type adapted to operate in a lubricant, a pair of races together providing a pair of radially spaced cylindrical surfaces defining an annular aperture therebetween, a first generally annular member within said aperture, means defining a plurality of circumferentially spaced openings in said first member, a second generally annular member in said aperture spaced radially from said first member, means defining a plurality of circumferentially spaced openings in said second member, a plurality of grippers respectively extending through openings in first and second members and tiltable to wedgingly engage said races or permit relative rotation therebetween, means for biasing said grippers in one direction, means on one of said members defining a non-uniform surface, means on the race adjacent said one member defining a non-uniform surface, said one member and adjacent race including means adapted to position said non-uniform surfaces in facing and close-spaced relation whereby the lubricant between said non-uniform surfaces will produce a fluid drag therebetween to cause rotation of said one member in the same direction as that of said adjacent race during low temperature operation of said device when the one-way engaging device operates in a lubricant.

6. In a one-way engaging device of the type adapted to operate in a lubricant, a pair of races together providing a pair of radially spaced cylindrical surfaces defining an annular aperture therebetween, a first generally annular member within said aperture, means defining a plurality of circumferentially spaced openings in said first member, a second generally annular member in said aperture spaced radially from said first member and rotatable relative thereto, means defining a plurality of circumferentially spaced openings in said second member, a plurality of grippers respectively extending through openings in said first and second members and tiltable to wedgingly engage said races or permit relative rotation therebetween, means biasing said grippers in one direction, means on one of said members defining a non-uniform surface, means on the race adjacent said one member defining a non-uniform surface, means on the other of said members and the race adjacent thereto interconnecting said other member and the race adjacent thereto for generally common rotation, the non-uniform surfaces on the said one member and adjacent race being constructed and arranged to position said non-uniform surfaces in facing closely spaced relations whereby the lubricant between said non-uniform surfaces will produce a drag therebetween during high speed relative movement therebetween and during low temperature operation of said device when the one-way engaging device operates in a lubricant.

7. The device defined in claim 6 in which said openings and said grippers are so constructed and arranged that the circumferentially facing sides of said grippers engage the circumferentially facing sides of said openings with only bearing clearance therebetween as said grippers tilt throughout their operating range, whereby the drag produced between said non-uniform surfaces during high speed relative movement therebetween effects lifting of the sprags off of one of the race surfaces.

8. The device defined in claim 6, in which said one member comprises an inner cage, and the race adjacent said one member comprises the inner race.

9. The device defined in claim 7, in which said one member comprises an inner cage, and in which said race adjacent said one member comprises the inner race.

10. In a one-way engaging device of a type adapted to operate in a fluid lubricant, the combination comprising an outer race having a generally cylindrical surface; an inner race including means defining an outer surface generally U-shaped in cross-section and including a cylindrical surface radially spaced from and facing said first-named cylindrical surface; a generally annular outer cage adjacent said outer race, means adapted to effect substantial common rotation of said outer cage and said outer race, means defining a plurality of circumferentially spaced openings in said outer cage, a generally annular inner cage rotatable relative to said outer cage including portions disposed within said opening defined by said U-shaped surface, means defining a plurality of circumferentially spaced openings in said inner cage, a plurality of grippers respectively extending through said openings in said inner and outer cages and tiltable to wedge between said surfaces or permit relative rotation therebetween, means adapted to bias said grippers toward wedging engagement between said races, and means on said portions of said inner cage and on said U-shaped surface respectively defining irregularities in said portion and surface, said irregularities on said portions of said inner cage being disposed in facing and closely spaced relation to said irregularities in said U-shaped surface whereby turbulence or shearing of the fluid between said surfaces on said inner cage and inner race will occur during high speed relative movement between the inner cage and inner race to effect a drag on the inner cage and consequent relative rotation between the inner and outer cages when the one-way engaging device operates in a lubricant.

11. In a one-way engaging device of a type adapted to operate in a fluid lubricant, the combination comprising an outer race having a generally cylindrical surface; an inner race comprising a cylindrical surface radially spaced from and facing said first-named cylindrical surface, a flange portion on said inner race having an axially facing surface, a ring portion on said inner race axially spaced from said flange portion and having an axially facing surface facing said axially facing surface on said flange portion; means defining serrations in said axially facing surfaces and at least a portion of said cylindrical surface of said inner race, a generally annular outer cage adjacent said outer race, means interconnecting said outer cage and said outer race for substantially common rotation, means defining a plurality of circumferentially spaced openings in said outer cage, a generally annular inner cage rotatable relative to said outer cage adjacent said annular surface on said inner race and including a portion disposed between said axially facing surfaces on said flange and ring, means defining a plurality of circumferentially spaced openings in said inner cage, a plurality of grippers respectively extending through said openings in said inner and outer cages and tiltable to wedge between said races or permit relative rotation therebetween, means adapted to bias said grippers toward wedging engagement between said races, and means on said inner cage defining serrations thereon facing and closely spaced from at least portions of said serrations on the inner race cylindrical surface and said axially facing surfaces whereby the fluid lubricant between the serrated surfaces will produce a drag therebetween during high speed relative movement therebetween to effect relative rotation between said cages when the one-way engaging device operates in a lubricant.

References Cited in the file of this patent

UNITED STATES PATENTS

| | | |
|---|---|---|
| 2,010,885 | Osterholm | Aug. 13, 1935 |
| 2,292,988 | Bloomfield et al. | Aug. 11, 1942 |
| 2,404,221 | Dodge | July 16, 1946 |
| 2,473,250 | Hoffman | June 14, 1949 |
| 2,683,509 | Jandasek | July 13, 1954 |

FOREIGN PATENTS

| | | |
|---|---|---|
| 1,095,050 | France | Dec. 15, 1954 |